United States Patent
Cunningham et al.

(10) Patent No.: US 11,169,016 B2
(45) Date of Patent: Nov. 9, 2021

(54) STANDARDS TRACEABLE VERIFICATION OF A VIBRATORY METER

(71) Applicant: Micro Motion, Inc., Boulder, CO (US)

(72) Inventors: Timothy J. Cunningham, Boulder, CO (US); Andrew Timothy Patten, Boulder, CO (US); Dean M. Standiford, Loveland, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/639,815

(22) PCT Filed: Aug. 30, 2017

(86) PCT No.: PCT/US2017/049291
§ 371 (c)(1),
(2) Date: Feb. 18, 2020

(87) PCT Pub. No.: WO2019/045702
PCT Pub. Date: Mar. 7, 2019

(65) Prior Publication Data
US 2020/0249071 A1   Aug. 6, 2020

(51) Int. Cl.
*G01F 25/00* (2006.01)
*G01F 1/84* (2006.01)

(52) U.S. Cl.
CPC ........ *G01F 25/0007* (2013.01); *G01F 1/8436* (2013.01)

(58) Field of Classification Search
CPC ........................... G01F 25/0007; G01F 1/8436
See application file for complete search history.

(56) References Cited

U.S. PATENT DOCUMENTS

2008/0234949 A1* 9/2008 Stack ................. G01F 25/0007
702/48

FOREIGN PATENT DOCUMENTS

| WO | 9939164 A1 | 8/1999 |
| WO | 2007040542 A1 | 4/2007 |

OTHER PUBLICATIONS

Nathan Hedrick: "How flowmeters perform self-verification", Jul. 11, 2017 (Jul. 11, 2017), XP055473728, Retrieved from the Internet: URL:https://www.us.endress.com/_storage/asset/4231524/storage/master/file/14364290/download/How%20flowmeters%20perform%20self-verification.pdf [retrieved on May 8, 2018].

(Continued)

*Primary Examiner* — Manuel L Barbee
(74) *Attorney, Agent, or Firm* — The Ollila Law Group LLC

(57) ABSTRACT

A system (600) and method (500) for a standards traceable verification of a vibratory meter (5) is provided. The system (600) includes a storage (610) having a baseline meter verification value of the vibratory meter and a processing system (620) in communication with the storage (610). The processing system (620) being configured to obtain the baseline meter verification value from the storage (610) and determine a relationship between the baseline meter verification value and a calibration value of the vibratory meter, said calibration value being traceable to a measurement standard. The method (500) provides a traceable verification of a vibratory meter by comparing (540) a physical property of the vibratory meter, which is determined from a first calibration value, to a reference value determined from a second calibration value, said calibration values being traceable to a measurement standard.

33 Claims, 6 Drawing Sheets

(56) References Cited

OTHER PUBLICATIONS

Endress&Hauser: "Go with the flow—How to verify, prove and calibrate Coriolis technology", Sep. 13, 2013 (Sep. 13, 2013), XP055473577, Retrieved from the Internet: URL://endress.primarytargetmedia.com/techdays-ab-2014/Tech%20Days%202014%20(Steve).pdf [retrieved on May 8, 2018].

* cited by examiner

STANDARDS TRACEABLE VERIFICATION OF A VIBRATORY METER

TECHNICAL FIELD

The embodiments described below relate to verification of a vibratory meter and, more particularly, to standards traceable verification of a vibratory meter.

BACKGROUND

Vibratory meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring characteristics of fluids. Generally, vibratory meters comprise a sensor assembly and an electronics portion. The material within the sensor assembly may be flowing or stationary. Each type of sensor may have unique characteristics, which a meter must account for in order to achieve optimum performance. For example, some sensors may require a tube apparatus to vibrate at particular displacement levels. Other sensor assembly types may require special compensation algorithms.

The meter electronics, among performing other functions, typically include stored sensor calibration values for the particular sensor being used. For example, the meter electronics may include a stiffness measurement. A baseline sensor stiffness represents a fundamental measurement related to the sensor geometry for a specific sensor assembly, as measured in the factory under reference conditions. A change between a stiffness measured after a vibratory meter is installed at a customer site and the baseline sensor stiffness may represent physical change in the sensor assembly due to coating, erosion, corrosion, or damage to conduits in the sensor assembly, in addition to other causes. If the meter stiffness is the same as the baseline meter stiffness, then the assumption may be made that physical change to the sensor assembly has not occurred.

However, the baseline stiffnesses, or other meter verification values, are not currently standards traceable. That is, although the values can be expressed using standard units, the quantity of the stiffness value is not considered traceable to a measurement standard, such as a standard mass, force, time, etc. A standards traceable verification would allow, for example, comparisons between meter verifications of different flow meters with the assurance that such comparisons are being made with standards traceable values. Accordingly, there is a need for standards traceable verification of vibratory meters.

SUMMARY

A system for a standards traceable verification of a vibratory meter is provided. According to an embodiment, the system comprises a storage having a baseline meter verification value of the vibratory meter and a processing system in communication with the storage. The processing system is configured to obtain the baseline meter verification value from the storage and determine a relationship between the baseline meter verification value and a calibration value of the vibratory meter, said calibration value being traceable to a measurement standard.

A method for standards traceable verification of a vibratory meter is provided. According to an embodiment, the method comprises determining a baseline meter verification value of the vibratory meter and determining a relationship between the baseline meter verification value and a calibration value of the vibratory meter, said calibration value being traceable to a measurement standard.

A method for a standards traceable verification of a vibratory meter is provided. According to an embodiment, the method comprises obtaining a relationship between a baseline meter verification value and a calibration value and determining a value of a physical property of the vibratory meter based on the relationship.

A method of standards traceable verification of a vibratory meter is provided. According to an embodiment, the method comprises determining a first baseline meter verification value of a first physical property of the vibratory meter, determining a relationship between the first baseline meter verification value and a calibration value of the first physical property, determining a value of a second physical property of the vibratory meter based on the relationship and a meter verification value of the second physical property and comparing the value of the second physical property to a calibration value of the second physical property.

ASPECTS

According to an aspect, a system (600) for a standards traceable verification of a vibratory meter (5) comprises a storage (610) having a baseline meter verification value of the vibratory meter (5) and a processing system (620) in communication with the storage (610). The processing system (620) is configured to obtain the baseline meter verification value from the storage (610) and determine a relationship between the baseline meter verification value and a calibration value of the vibratory meter (5), said calibration value being traceable to a measurement standard.

Preferably, the processing system (620) being configured to determine the baseline meter verification value of the vibratory meter comprises the processing system (620) being configured to determine the baseline meter verification value associated with one of a right pick-off sensor and a left pick-off sensor.

Preferably, the processing system (620) being configured to determine the baseline meter verification value of the vibratory meter comprises the processing system (620) being configured to determine the following equation:

$$\text{Stiffness}_{SMV} = \text{Stiffness}_{Physical} \cdot G;$$

where:
   $\text{Stiffness}_{SMV}$ is a stiffness meter verification value of the vibratory meter that is the baseline meter verification value;
   $\text{Stiffness}_{Physical}$ is a physical stiffness value of the vibratory meter; and
   G is a gain associated with one of a left pick-off sensor and a right pick-off sensor.

Preferably, the processing system (620) being configured to determine the relationship between the baseline meter verification value and the calibration value comprises the processing system (620) being configured to determine a gain between the baseline meter verification value and the calibration value.

Preferably, the gain is associated with one of a right pick-off sensor and a left pick-off sensor.

Preferably, the gain is determined using one of the following equations:

$$G_{RPO} = \frac{Stiffness_{SMVRPO}}{FCF}; \text{ and}$$

$$G_{LPO} = \frac{Stiffness_{SMVLPO}}{FCF};$$

where:
$G_{LPO}$ is a gain associated with a left pick-off sensor;
$G_{RPO}$ is a gain associated with a right pick-off sensor;
$Stiffness_{SMVRPO}$ is a stiffness meter verification value associated with the right pick-off sensor;
$Stiffness_{SMVLPO}$ is a stiffness meter verification value associated with the left pick-off sensor; and
FCF is a flow calibration factor of the vibratory meter and is the calibration value expressed in units of stiffness.

Preferably, the processing system (620) being configured to determine a relationship between the baseline meter verification value and the calibration value comprises the processing system (620) being configured to use the following equation:

$$Stiffness_{Physical} = FCF;$$

where:
$Stiffness_{Physical}$ is a physical stiffness value of the vibratory meter; and
FCF is a flow calibration factor of the vibratory meter and is the calibration value of the vibratory meter expressed in units of stiffness.

Preferably, determining the relationship between the baseline meter verification value and the calibration value of the vibratory meter (5) comprises determining a reference physical property value from the calibration value.

Preferably, the baseline meter verification value is one of a baseline mass meter verification value and a baseline stiffness meter verification value of the vibratory meter.

Preferably, the calibration value is one of a flow calibration factor and a tube period of the vibratory meter.

According to an aspect, a method for standards traceable verification of a vibratory meter comprises determining a baseline meter verification value of the vibratory meter and determining a relationship between the baseline meter verification value and a calibration value of the vibratory meter, said calibration value being traceable to a measurement standard.

Preferably, determining the baseline meter verification value of the vibratory meter comprises determining a baseline meter verification value associated with one of a right pick-off sensor and a left pick-off sensor.

Preferably, determining the baseline meter verification value of the vibratory meter comprises using the following equation:

$$Stiffness_{SMV} = Stiffness_{Physical} \cdot G;$$

where:
$Stiffness_{SMV}$ is a stiffness meter verification value of the vibratory meter that is the baseline meter verification value;
$Stiffness_{Physical}$ is a physical stiffness value of the vibratory meter; and
G is a gain associated with one of a left pick-off sensor and a right pick-off sensor.

Preferably, determining the relationship between the baseline meter verification value and the calibration value comprises determining a gain between the baseline meter verification value and the calibration value.

Preferably, the gain is associated with one of a right pick-off sensor and a left pick-off sensor.

Preferably, the gain is determined using one of the following equations:

$$G_{RPO} = \frac{Stiffness_{SMVRPO}}{FCF}; \text{ and}$$

$$G_{LPO} = \frac{Stiffness_{SMVLPO}}{FCF};$$

where:
$G_{LPO}$ is a gain associated with a left pick-off sensor;
$G_{LPO}$ is a gain associated with a right pick-off sensor;
$Stiffness_{SMVRPO}$ is a stiffness meter verification value associated with the right pick-off sensor;
$Stiffness_{SMVLPO}$ is a stiffness meter verification value associated with the left pick-off sensor; and
FCF is a flow calibration factor of the vibratory meter and is the calibration value expressed in units of stiffness.

Preferably, determining the relationship between the baseline meter verification value and the calibration value comprises using the following equation:

$$Stiffness_{physical} = FCF;$$

where:
$Stiffness_{Physical}$ is a physical stiffness value of the vibratory meter; and
FCF is a flow calibration factor of the vibratory meter and is the calibration value of the vibratory meter expressed in units of stiffness.

Preferably, determining the relationship between the baseline meter verification value and the calibration value comprises determining a reference physical property value from the calibration value.

Preferably, the baseline meter verification value is one of a baseline mass meter verification value and a baseline stiffness meter verification value of the vibratory meter.

Preferably, the calibration value is one of a flow calibration factor and a tube period of the vibratory meter.

According to an aspect, a method for a standards traceable verification of a vibratory meter comprises obtaining a relationship between a baseline meter verification value and a calibration value and determining a value of a physical property of the vibratory meter based on the relationship.

Preferably, the baseline meter verification value is one of a baseline stiffness meter verification value and a baseline mass meter verification value and the calibration value is one of a flow calibration factor and a tube period of the vibratory meter.

Preferably, obtaining the relationship between the baseline meter verification value and the calibration value comprises obtaining a gain determined using one of the following equations:

$$G_{RPO} = \frac{Stiffness_{SMVRPO}}{FCF}; \text{ and}$$

$$G_{LPO} = \frac{Stiffness_{SMVLPO}}{FCF};$$

where:
$G_{LPO}$ is a gain associated with a left pick-off sensor;
$G_{RPO}$ is a gain associated with a right pick-off sensor;
$Stiffness_{SMVRPO}$ is a stiffness value associated with the right pick-off sensor;
$Stiffness_{SMVLPO}$ is a stiffness value associated with the left pick-off sensor; and FCF is a flow calibration factor of the vibratory meter and is the calibration value expressed in units of stiffness.

Preferably, determining the value of the physical property of the vibratory meter based on the relationship comprises determining a physical mass value of the vibratory meter based on a mass meter verification value of the vibratory meter and a gain.

Preferably, determining the physical mass value of the vibratory meter based on the mass meter verification value of the vibratory meter and the gain comprises determining one of the following equations:

$$Mass_{SMVPhysicalLPO} = \frac{Mass_{SMVLPO}}{G_{LPO}};$$

where:
$Mass_{SMVPhysicalLPO}$ is the physical mass value of the vibratory meter determined using a left pick-off sensor;
$Mass_{SMVLPO}$ is the mass meter verification value of the vibratory meter associated with the left pick-off sensor;
$G_{LPO}$ is a gain associated with the left pick-off sensor; and $$Mass_{SMVPhysicalRPO} = \frac{Mass_{SMVRPO}}{G_{RPO}};$$

where:
$Mass_{SMVPhysicalRPO}$ is a physical mass value of the vibratory meter determined using the right pick-off sensor;
$Mass_{SMVRPO}$ is the mass meter verification value of the vibratory meter associated with the right pick-off sensor; and
$G_{RPO}$ is a gain associated with the right pick-off sensor.

Preferably, the method further comprises comparing the value of the physical property of the vibratory meter to a reference physical property value determined from a second calibration value of the vibratory meter.

Preferably, comparing the value of the physical property of the vibratory meter to the reference physical property value comprises determining a deviation from the reference physical property value using one of the following equations:

$$Mass_{traceableDeviationLPO} = \frac{Mass_{SMVPhysicalLPO} - m_{reference}}{m_{reference}} \cdot 100;$$

where:
$Mass_{traceableDeviationLPO}$ is a standards traceable deviation of the physical property as measured by a left pick-off sensor from the reference physical property value;
$Mass_{SMVPhysicalLPO}$ is a physical mass value of the vibratory meter determined using the left pick-off sensor that is the physical property of the vibratory meter; and
$m_{reference}$ is a reference mass value that is the reference physical property value of the vibratory meter; and $$Mass_{traceableDeviationRPO} = \frac{Mass_{SMVPhysicalRPO} - m_{reference}}{m_{reference}} \cdot 100;$$

where:
$Mass_{traceableDeviationRPO}$ is a standards traceable deviation of the physical property as measured by the right pick-off sensor from the reference physical property value;

$Mass_{SMVPhysicalRPO}$ is a physical mass of the vibratory meter measured by the right pick-off sensor that is the physical property of the vibratory meter; and
$m_{reference}$ is a reference mass value that is the reference physical property value of the vibratory meter.

Preferably, the reference physical property value is a reference mass value that is determined using the following equation:

$$m_{reference} = \frac{FCF}{(freq_{reference})^2}$$

$m_{reference}$ is the reference mass value that is the reference physical property value;
FCF is a flow calibration factor that is the calibration value expressed in units of stiffness; and
$freq_{reference}$ is a reference frequency value that is determined from a second calibration value, the second calibration value being a tube period on air K1.

According to an aspect, a method of standards traceable verification of a vibratory meter comprises determining a first baseline meter verification value of a first physical property of the vibratory meter, determining a relationship between the first baseline meter verification value and a calibration value of the first physical property, determining a value of a second physical property of the vibratory meter based on the relationship and a meter verification value of the second physical property and comparing the value of the second physical property to a calibration value of the second physical property.

Preferably, the first baseline meter verification value is one of a baseline mass meter verification value, a baseline stiffness meter verification value, and a baseline conduit amplitude value.

Preferably, determining the relationship between the first baseline meter verification value and the calibration value of the first physical property comprises determining a gain between the first baseline meter verification value and the calibration value of the first physical property.

Preferably, comparing the value of the second physical property to the calibration value of the second physical property comprises comparing the value of the second physical property to a reference physical property value determined from the calibration value.

Preferably, the method further comprises performing a frequency check of at least one of the first baseline meter verification value, the calibration value of the first physical property, the value of the second physical property, and the comparison of the value of the second physical property and the calibration value of the second physical property.

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of embodiments of standards traceable verification of a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the standards traceable verification of the vibratory meter. As a result, the embodiments described below are not limited to the specific examples described below, but only by the claims and their equivalents.

Standards traceable meter verification of the vibratory meter can be accomplished by determining a baseline meter verification value of the vibratory meter and determining a relationship between the baseline meter verification value and the calibration value of the vibratory meter, where the calibration value is traceable to a measurement standard. Determining the relationship between the baseline meter verification value and the calibration value may, for example, include determining a gain associated with pick-off sensors in the vibratory meter and multiplying the calibration value by the gain.

This relationship can be based on an equality between a physical property measured during meter verification and a reference physical property determined during calibration. For example, a baseline physical stiffness value should be the same as a reference stiffness value determined from a calibration factor, such as a flow calibration factor, which is the calibration value traceable to the measurement standard.

Since the calibration value is traceable to the measurement standard, a comparison based on a meter verification value, such as a physical mass value determined during meter verification, and the calibration value, such as the reference mass value determined from the tube period, is also traceable. For example, a mass deviation which is comprised of a difference between the physical mass value and the reference mass value is considered standards traceable.

Figure 1:
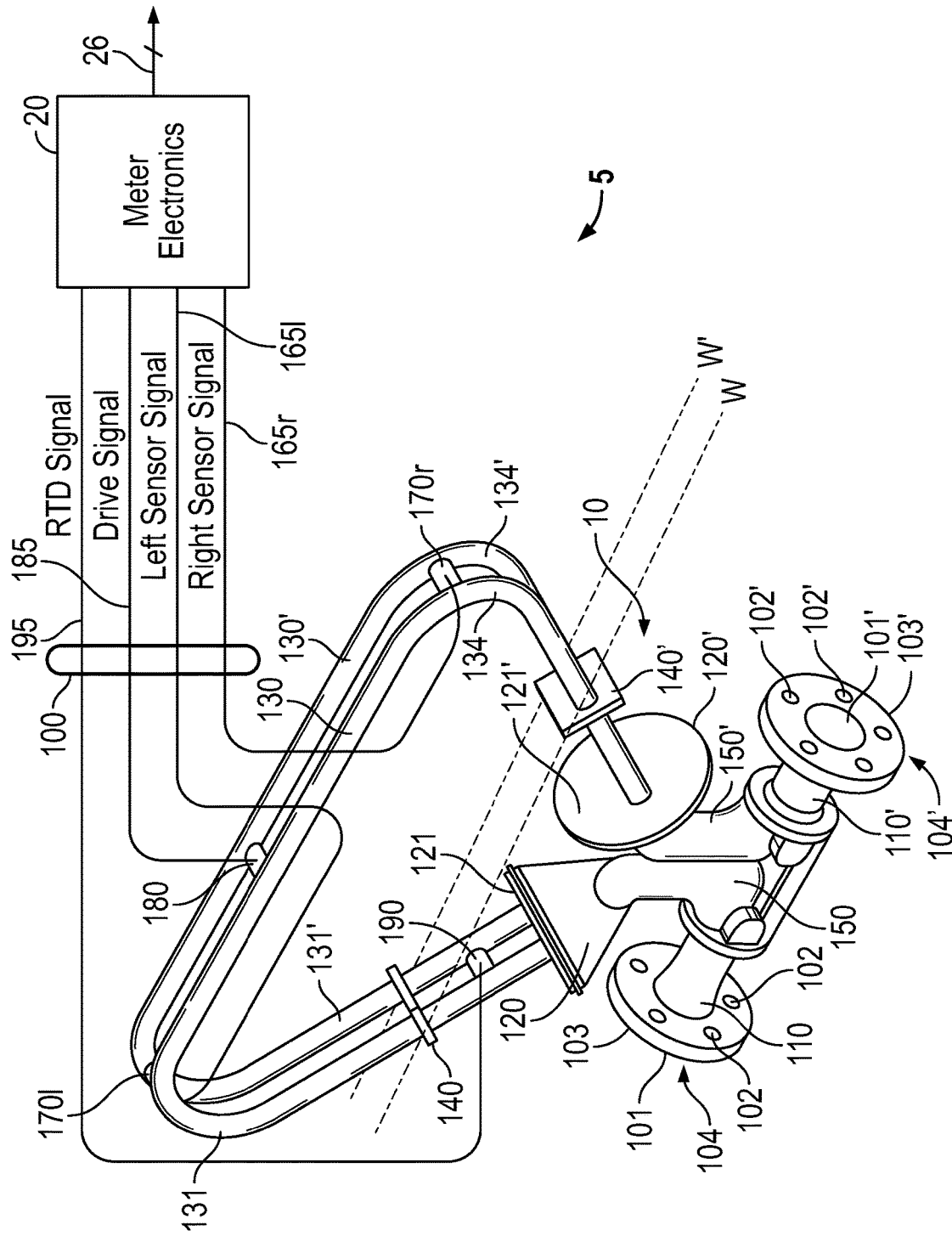
FIG. 1 shows a vibratory meter 5 verifiable by a standards traceable verification.

FIG. 1 shows a vibratory meter 5 verifiable by a standards traceable verification. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over path 26, as well as other information.

The sensor assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170*l* and 170*r*. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal 185 is applied by the meter electronics 20, via a lead, to the driver 180.

The meter electronics 20 receives the RTD temperature signal on lead 195, and the left and right sensor signals appearing on leads 100 carrying the left and right sensor signals 165*l*, 165*r*, respectively. The meter electronics 20 produces the drive signal 185 appearing on the lead to driver 180 and vibrate conduits 130, 130'. The meter electronics 20 processes the left and right sensor signals and the RTD signal to compute the mass flow rate and the density of the material passing through sensor assembly 10. This information, along with other information, is applied by meter electronics 20 over path 26 as a signal.

Figure 2:
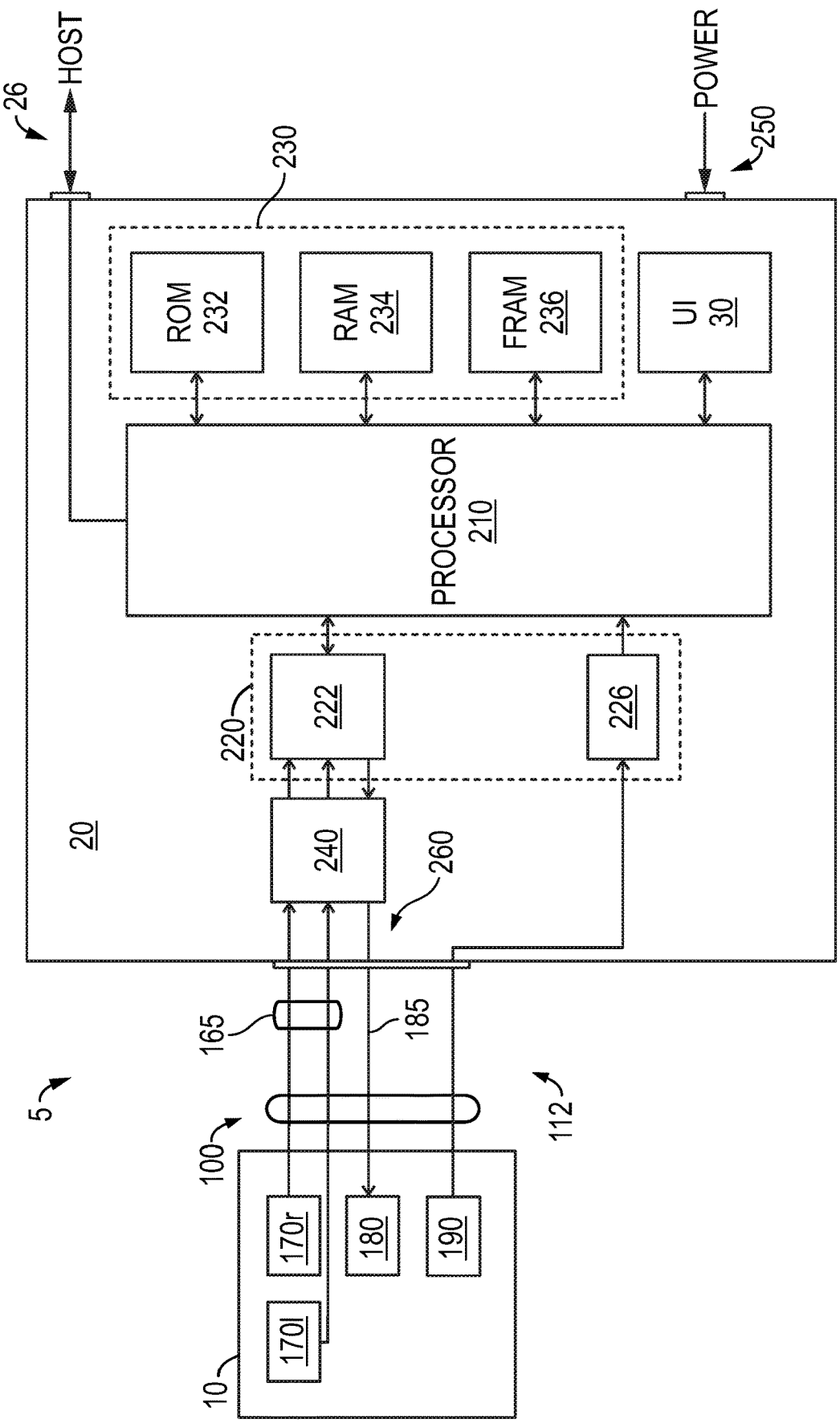
FIG. 2 shows a block diagram of the vibratory meter 5, including a block diagram representation of the meter electronics 20.

FIG. 2 shows a block diagram of the vibratory meter 5, including a block diagram representation of the meter electronics 20. As shown in FIG. 2, the meter electronics 20 is communicatively coupled to the sensor assembly 10. As described in the foregoing with reference to FIG. 1, the sensor assembly 10 includes the left and right pick-off sensors 170*l*, 170*r*, driver 180, and temperature sensor 190, which are communicatively coupled to the meter electronics 20 via the set of leads 100 through a communications channel 112 and an I/O port 260.

The meter electronics 20 provides a drive signal 185 via the leads 100. More specifically, the meter electronics 20 provides a drive signal 185 to the driver 180 in the sensor assembly 10. In addition, sensor signals 165 are provided by the sensor assembly 10. More specifically, in the embodiment shown, the sensor signals 165 are provided by the left and right pick-off sensor 170l, 170r in the sensor assembly 10. As can be appreciated, the sensor signals 165 are respectively provided to the meter electronics 20 through the communications channel 112.

The meter electronics 20 includes a processor 210 communicatively coupled to one or more signal processors 220 and one or more memories 230. The processor 210 is also communicatively coupled to a user interface 30. The processor 210 is communicatively coupled with the host via a communication port over the path 26 and receives electrical power via an electrical power port 250. The processor 210 may be a microprocessor although any suitable processor may be employed. For example, the processor 210 may be comprised of sub-processors, such as a multi-core processor, serial communication ports, peripheral interfaces (e.g., serial peripheral interface), on-chip memory, I/O ports, and/or the like. In these and other embodiments, the processor 210 is configured to perform operations on received and processed signals, such as digitized signals.

The processor 210 may receive digitized sensor signals from the one or more signal processors 220. The processor 210 is also configured to provide information, such as a phase difference, a property of a fluid in the sensor assembly 10, or the like. The processor 210 may provide the information to the host through the communication port. The processor 210 may also be configured to communicate with the one or more memories 230 to receive and/or store information in the one or more memories 230. For example, the processor 210 may receive calibration factors and/or sensor assembly zeros (e.g., phase difference when there is zero flow) from the one or more memories 230. Each of the calibration factors and/or sensor assembly zeros may respectively be associated with the flow meter 5 and/or the sensor assembly 10. The processor 210 may use the calibration factors to process digitized sensor signals received from the one or more signal processors 220.

The one or more signal processors 220 is shown as being comprised of an encoder/decoder (CODEC) 222 and an analog-to-digital converter (ADC) 226. The one or more signal processors 220 may condition analog signals, digitize the conditioned analog signals, and/or provide the digitized signals. The CODEC 222 is configured to receive the sensor signals 165 from the left and right pick-off sensors 170l, 170r via a signal conditioner 240. The CODEC 222 is also configured to provide the drive signal 185 to the driver 180 via the signal conditioner 240. In alternative embodiments, more or fewer signal processors may be employed.

As shown, the sensor signals 165 are provided to the CODEC 222 via a signal conditioner 240. The drive signal 185 is provided to the driver 180 via the signal conditioner 240. Although the signal conditioner 240 is shown as a single block, the signal conditioner 240 may be comprised of signal conditioning components, such as two or more op-amps, filters, such as low pass filters, voltage-to-current amplifiers, or the like. For example, the sensor signals 165 may be amplified by a first amplifier and the drive signal 185 may be amplified by the voltage-to-current amplifier. The amplification can ensure that the magnitude of the sensor signals 165 is approximate the full scale range of the CODEC 222.

In the embodiment shown, the one or more memories 230 is comprised of a read-only memory (ROM) 232, random access memory (RAM) 234, and a ferroelectric random-access memory (FRAM) 236. However, in alternative embodiments, the one or more memories 230 may be comprised of more or fewer memories. Additionally or alternatively, the one or more memories 230 may be comprised of different types of memory (e.g., volatile, non-volatile, etc.). For example, a different type of non-volatile memory, such as, for example, erasable programmable read only memory (EPROM), or the like, may be employed instead of the FRAM 236. The one or more memories 230 may be a storage configured to store data, such as calibration values, meter verification values, or the like.

Calibration

A mass flow rate measurement ($\dot{m}$) can be generated according to the equation:

$$\dot{m} = FCF[\Delta t - \Delta t_0] \qquad [1]$$

The $\Delta t$ term comprises an operationally-derived (i.e., measured) time delay value comprising the time delay existing between the pickoff sensor signals, such as where the time delay is due to Coriolis effects related to mass flow rate through the vibratory flowmeter 5. The measured $\Delta t$ term ultimately determines the mass flow rate of the flow material as it flows through the vibratory flowmeter 5. The $\Delta t_0$ term comprises a time delay/phase difference at zero flow calibration constant. The $\Delta t_0$ term is typically determined at the factory and programmed into the vibratory flowmeter 5. The time delay/phase difference at zero flow $\Delta t_0$ term will not change, even where flow conditions are changing. The flow calibration factor FCF is proportional to a physical stiffness of the flow meter.

Calibration may also determine a resonant or drive frequency of the conduits 130, 130' when the conduits 130, 130' contain a known material, such as air or water. For example, the tube period on air K1 is the resonant frequency of the conduits 130, 130' when they contain air. The tube period on water K2 may be the resonant frequency of the conduits 130, 130' when they contain water. The flow calibration factor FCF, tube period on air K1, and tube period on water K2 values determined at calibration may be stored as initial factory calibration data, for example, at a service center for later retrieval, although any suitable storage location or means may be employed. The initial calibration factory data may be considered standards traceable. For example, the flow calibration factor FCF, tube period on air K1, and tube period on water K2 may be considered traceable to a standard unit under accreditation standards, such as, for example, the International Standards Organization (ISO) 17025 standard or American National Standards Institute/National Conference of Standards Laboratory (ANSI/NCSL) Z540-1-1994; part 1, or other standards, such as international or national standards. The calibration factory data can be traceable to measurement standards defined in, for example, ISO 31, International Electrotechnical Commission (IEC) 60027, or other international or national standards. The measurement standards can be in base units or derived units defined in the international or national standards, and/or units defined outside the standards but are related to the base and/or derived units defined in the international or national standards.

It is a problem that the conduits 130, 130' may change with time, such that the flow calibration factor FCF, tube period on air K1, and tube period on water K2 values may change over time relative to the initial factory calibration data as the conduits 130, 130' are corroded, eroded, or otherwise changed. As a consequence, the conduits' 130, 130' stiffness may change from a baseline stiffness value over the life of the vibratory meter 5. Meter verification can detect such changes in the conduits' 130, 130' stiffness, as will be described in more detail in the following.

Meter Verification

As previously discussed, the flow calibration factor FCF reflects the material properties and cross-sectional properties of the flow tube and geometric shape of the flow tube. A mass flow rate of flow material flowing through the flow meter is determined by multiplying a measured time delay (or phase difference/frequency) by the flow calibration factor FCF. The flow calibration factor FCF can be related to a stiffness characteristic of the sensor assembly. If the stiffness characteristic of the sensor assembly changes, then the flow calibration factor FCF will also change. Changes in the physical stiffness of the flow meter therefore will affect the accuracy of the flow measurements generated by the flow meter.

A stiffness change can be a value that is determined by comparing a meter stiffness to a baseline meter stiffness. For example, the stiffness change can be a difference between the meter stiffness and the baseline meter stiffness. In this example, a negative number may indicate that the stiffness of the conduits 130, 130' decreased since being installed in the field. A positive number may indicate that the physical stiffness of the conduits 130, 130' increased since the baseline meter stiffness was determined.

If the meter stiffness is substantially the same as the baseline meter stiffness, then it can be determined that the vibratory flowmeter 5, or more specifically, the conduits 130, 130', may be relatively unchanged from when it was manufactured, calibrated, or when the vibratory flowmeter 5 was last re-calibrated/verified. Alternatively, where the meter stiffness significantly differs from the baseline meter stiffness, then it can be determined that the conduits 130, 130' have degraded and may not be operating accurately and reliably, such as where the conduits 130, 130' have changed due to erosion, corrosion, damage (e.g., freezing, over-pressurization, etc.), coating, or other condition.

The left pick-off sensor 170l and the right pick-off sensor 170r can each have their own associated stiffness value. More specifically, as discussed above, the driver 180 applies a force to the conduits 130, 130' and the pick-off sensors 170l, 170r measure a resulting deflection. The amount of deflection (e.g., amplitude) of the conduits 130, 130' at the location of the pick-off sensors 170l, 170r is proportional to the stiffness of the conduits 130, 130' between the driver 180 and the pick-off sensors 170l, 170r. Accordingly, a mass, stiffness, or other meter verification value associated with a left or right pick-off sensor 170l, 170r can be used to detect a change in the conduits 130, 130' between each pick-off sensor 170l, 170r and the driver 180. That is, the mass, stiffness, or other meter verification parameter may be for each pick-off sensor-driver pair.

With reference to the vibratory meter 5 shown in FIG. 2, there may be a gain associated with the left and right pick-off sensors 170l, 170r as well as components in the meter electronics 20, such as the CODEC 222 and signal conditioner 240, and DSP scaling. Accordingly, the gain associated with the left pick-off sensor 170l is a gain of the left pick-off sensor 170l-driver 180 pair and the gain associated with the right pick-off sensor 170r is a gain of the right pick-off sensor 170r-driver 180 pair. The gain associated with the left and right pick-off sensors 170l, 170r may be referred to as a "sensor term" or "sensor gain" of the overall gain and gain associated with the components in the meter electronics 20 may be referred to as an "electronics term" or "electronics gain" of the overall gain.

As is explained in more detail in the following, a standards traceable verification may be realized by relating the baseline meter stiffness value, such as baseline left or right pick-off stiffness values, to the standards traceable flow calibration factor FCF, tube period on air K1, and/or tube period on water K2 values. The following methods illustrate how the baseline meter stiffness values can be related to the standards traceable flow calibration factor FCF, tube period on air K1, and/or tube period on water K2.

Standards Traceability

Figure 3:
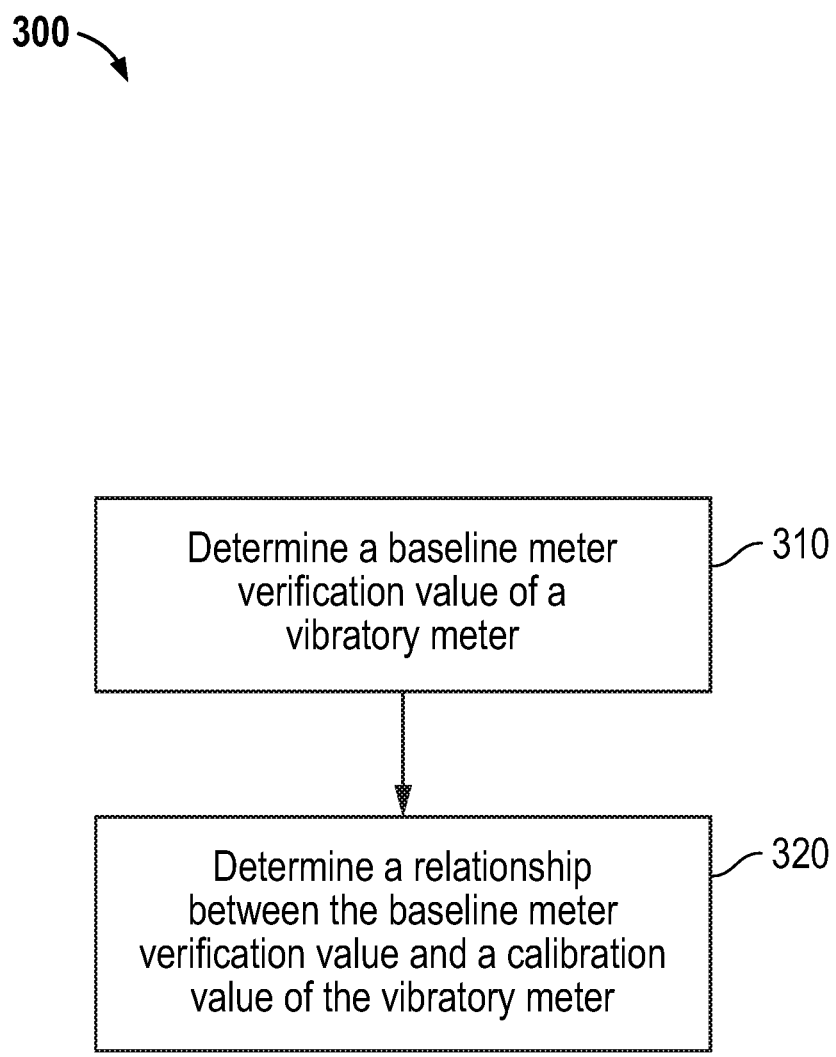
FIG. 3 shows a method 300 for standards traceable verification of a vibratory meter.

FIG. 3 shows a method 300 for standards traceable verification of a vibratory meter. As shown in FIG. 3, the method 300 begins by determining a baseline meter verification value of the vibratory meter. The vibratory meter may be the vibratory meter 5 shown in FIG. 1, although any suitable vibratory meter may be employed. In step 320, the method 300 determines a relationship between the baseline meter verification value and a calibration value of the vibratory meter. The calibration value is traceable to a measurement standard.

The baseline meter verification value of the vibratory meter determined in step 310 may be any suitable value, such as a baseline meter stiffness value. For example, the baseline meter verification value may be a left pick-off stiffness value, a right pick-off stiffness value, a left pick-off mass value, a right pick-off mass value, etc. These and other baseline meter verification values may have a relationship with the physical properties of the vibratory meter, such as the physical mass, physical stiffness, etc.

The relationship between the baseline meter verification value and the physical property may be any suitable value and may, for example, correspond to the sensor and/or electronics gain discussed above with reference to FIG. 2. For example, the baseline meter verification value may be a baseline stiffness value determined using the left and right pick-off sensors 170l, 170r, the driver 180, and meter electronics 20, including the CODEC 222 and signal conditioner 240. Accordingly, the relationship between, for example, the baseline right pick-off stiffness value and a physical stiffness of the conduits 130, 130' associated with the right pick-off sensor 170r may be the sensor gain of the right pick-off sensor 170r and the electronics gain of the CODEC 222 and signal conditioner 240.

In an example, the baseline meter verification value may be determined based on a physical property, such as a physical mass or a physical stiffness multiplied by the gain. By way of illustration, the following equation may be employed to determine a baseline stiffness value using the pick-off gain and the electronics gain:

$$\text{Stiffness}_{SMV} = \text{Stiffness}_{Physical} \cdot G; \qquad [2]$$

where:
Stiffness$_{SMV}$ is a baseline stiffness value of the vibratory meter that is an exemplary baseline meter verification value;

Stiffness$_{Physical}$ is a physical stiffness value of the vibratory meter; and G is a gain associated with one of a left pick-off sensor or a right pick-off sensor used to measure the physical stiffness Stiffness$_{Physical}$ of the vibratory meter to determine the baseline stiffness value Stiffness$_{SMV}$.

The gain G used in the above example can be determined by using the baseline meter verification stiffness value associated with the left and right pick-off sensors and the flow calibration factor. For example, the following equations may be used:

$$G_{RPO} = \frac{Stiffness_{SMVRPO}}{FCF}; \text{ and} \quad [3]$$

$$G_{LPO} = \frac{Stiffness_{SMVLPO}}{FCF}; \quad [4]$$

where:
$G_{LPO}$ is a gain associated with the left pick-off sensor;
$G_{RPO}$ is a gain associated with the right pick-off sensor;
Stiffness$_{SMVRPO}$ is a stiffness value associated with the right pick-off sensor;
Stiffness$_{SMVLPO}$ is a stiffness value associated with the left pick-off sensor; and
FCF is a flow calibration factor of the vibratory meter that is an exemplary calibration value expressed in units of stiffness.

Equations [3] and [4] can be used to determine the gains $G_{LPO}$ and $G_{RPO}$ because both the flow calibration factor FCF and the baseline stiffness values are determined using the same left and right sensors, such as the left and right pick-off sensors 170l, 170r shown in FIG. 1, as well as the same electronics, such as the meter electronics 20 with the CODEC 222 and signal conditioner 240, shown in FIG. 1. Accordingly, gains $G_{LPO}$, $G_{RPO}$ associated with the left and right pick-off sensors 170l, 170r can be determined from ratios of the baseline stiffness values and the flow calibration factor FCF.

In step 320, determining the relationship between the baseline meter verification value and the calibration value of the vibratory meter can comprise equating a physical property of the vibratory meter measured by the pick-off sensors with the calibration value. The calibration value may be, for example, a calibration factor, a tube period of the vibratory meter, or the like. The calibration factor may be the flow calibration factor FCF that is multiplied with a time delay between two sensors to determine a mass flow rate, although any suitable calibration factor may be employed. For example, the calibration factor may be a value that is multiplied with a phase difference between left and right pick-offs in the vibratory meter.

The comparison between the calibration value and the meter verification may be based on an equality of the calibration factor and the physical stiffness of the vibratory meter. Accordingly, the relationship between the physical property of the vibratory meter and the calibration value can comprise the following equation:

$$Stiffness_{Physical} = FCF; \quad [5]$$

where:
Stiffness$_{Physical}$ is a physical stiffness of the vibratory meter that is the physical property of the vibratory meter; and FCF is a flow calibration factor of the vibratory meter and is the calibration value of the vibratory meter expressed in units of stiffness.

This relationship between the physical stiffness of the vibratory meter and FCF can be based on a conversion of a flow calibration factor FCF value to a stiffness value, as the following illustrates.

The flow calibration factor FCF may be in units of $$\frac{gm}{sec} \cdot \frac{1}{\mu sec},$$

although any suitable units may be employed. The flow calibration factor FCF may be corrected to standard conditions, such as a temperature of zero degrees Celsius (0° C.). The baseline stiffness value may be in, for example, units of $$\frac{lbf}{in},$$

although any suitable unit may be employed. The flow calibration factor FCF may be converted into the same units as the units of the baseline stiffness value by using a scaling factor, such as, for example, 5.7101, which is from the relationship:

$$1 \text{ gm} = 5.71 \times 10^{-6} \frac{lbf \cdot sec^2}{in}.$$

By way of illustration, an exemplary flow calibration factor FCF value is shown below:

$$FCF = 4.91 \frac{\left(\frac{gm}{sec}\right)}{\mu sec}.$$

As described above, the above flow calibration factor FCF value can be converted into stiffness units by using the $$1 \text{ gm} = 5.71 \times 10^{-6} \frac{lbf \cdot sec^2}{in}$$

relationship. After performing such a conversion, the flow calibration factor FCF value, expressed as a stiffness value, is:

$$FCF = 1.082 \cdot \frac{lbm}{10^{-4} sec^2}.$$

However, this flow calibration factor FCF value is not in fundamental units—the pounds-mass unit (lbm) is not a fundamental unit. Accordingly, to obtain the flow calibration factor FCF value in fundamental units, an additional unit conversion is done. After converting the above value into fundamental units, the flow calibration factor FCF value in fundamental units is:

$$FCF = 28.04 \cdot \frac{\text{lbf}}{\text{in}}.$$

Accordingly, the flow calibration factor FCF, expressed as a stiffness value in fundamental units, can be equal to the physical stiffness of the vibratory meter as measured by the pick-off sensors, as the above equation [5] illustrates.

As can be appreciated, because both the baseline meter verification value and the calibration value, which is traceable to a measurement standard, are determined using the same pick-off sensors and electronics, such as the left and right pick-off sensors 170*l*, 170*r* and meter electronics 20 shown in FIG. 1, the gains can be used to determine a relationship between various baseline meter verification values, such as a baseline mass meter verification value, and various calibration values, such as the tube period on air K1, as the following illustrates.

Figure 4:
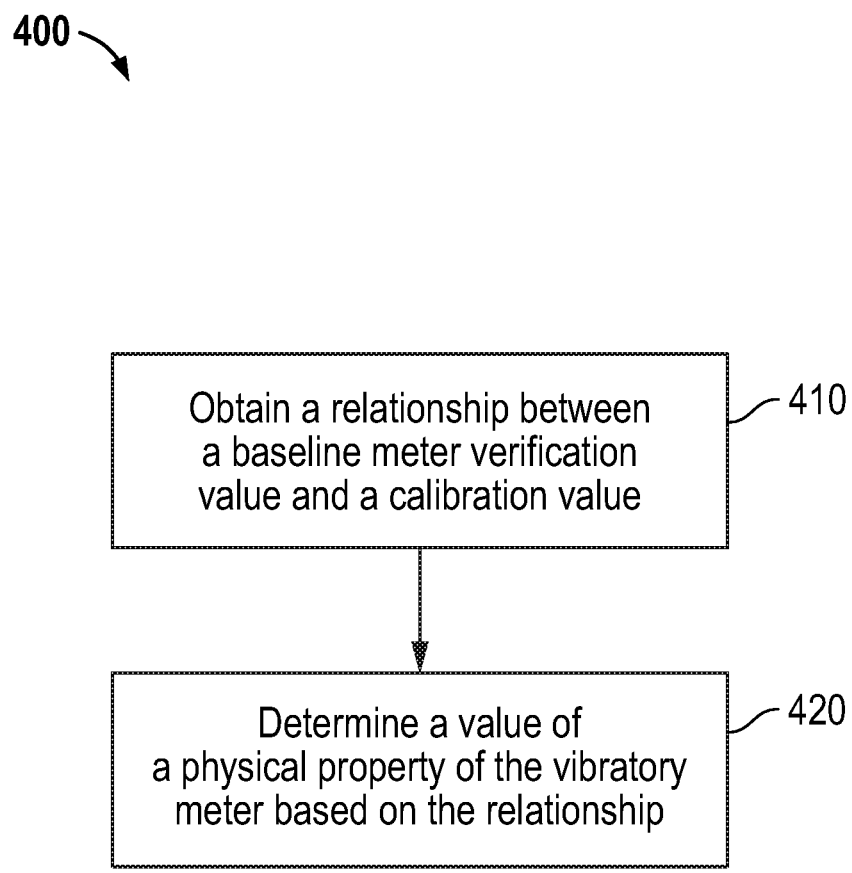
FIG. 4 shows a method 400 for standards traceable verification of a vibratory meter.

FIG. 4 shows a method 400 for a standards traceable verification of a vibratory meter. As shown in FIG. 4, the method 400 begins by obtaining a relationship between a baseline meter verification value and a calibration value in step 410. The baseline meter verification value can be the baseline meter stiffness value of the vibratory meter, such as the baseline left and/or right pick-off stiffness values. The relationship may be a gain, such as the gains $G_{LPO}$, $G_{RPO}$ discussed above. In step 420, the method 400 determines a value of a physical property, such as a physical mass value, of the vibratory meter based on the relationship. The value of the physical property may be determined based on the relationship by, for example, multiplying the gain with a physical mass value determined from a baseline mass value. This physical mass value determined from the baseline mass value can be compared to a reference mass determined from the calibration value.

As discussed above, the calibration value may include the tube period on air K1, which is the period of the conduit when the conduit/tube is filled with air. Since air is significantly less massive than steel, or other materials typically measured in conduits of the vibratory meter, the tube period on air K1 is proportional to the mass of the conduit. The units of the tube period on air K1 may be in μsecs, although any suitable unit may be employed. The tube period on air K1 may be corrected to standard conditions, such as a temperature of zero degrees Celsius (0° C.). As can be appreciated, the tube period on water K2 may be employed.

A reference mass value $m_{reference}$ can be determined from the tube period on air K1. As can be appreciated, the reference mass value $m_{reference}$ is traceable to the measurement standard and is in a fundamental unit of mass. The reference mass value $m_{reference}$ may be determined, for example, using the following equations [6]-[8], although any suitable equations and relationships may be employed. In particular, a resonant frequency of a conduit can be determined from:

$$freq = \sqrt{\frac{\text{stiffness}}{\text{mass}}} = \sqrt{\frac{k}{m}}. \qquad [6]$$

In addition, the tube period on air K1, which is in units of time, can be converted into a frequency by using the f=1/T relationship. In an example where the tube period on air K1 is in units of μsecs and it is desired that the frequency be in units of radians-per-second, the following equation [7] may be employed to obtain a reference frequency $freq_{reference}$ of the tube from the tube period on air K1:

$$freq_{reference} = \frac{10^6 \cdot 2 \cdot \pi}{K1}. \qquad [7]$$

By using above equation [7] and the reference frequency $freq_{reference}$, as well as the equality between the flow calibration factor FCF and the physical stiffness $Stiffness_{Physical}$ of equation [5], the reference mass value $m_{reference}$ of the tube may be determined, as the following equation [8] illustrates:

$$m_{reference} = \frac{k}{(freq_{reference})^2} = \frac{FCF}{(freq_{reference})^2}. \qquad [8]$$

A gain, such as the gains associated with the left and right pick-off sensors $G_{RPO}$, $G_{LPO}$ determined above using equations [3]-[4], can be used to determine a relationship between a value of a physical property and a meter verification value. For example, the meter verification value may comprise meter verification mass value $Mass_{SMV}$. In this example, meter verification mass value $Mass_{SMV}$ can be related to a physical mass value $Mass_{physical}$ using the following equation [9]:

$$Mass_{SMV} = Mass_{Physical} \cdot G. \qquad [9]$$

Accordingly, the physical mass value $Mass_{physical}$ associated with each pick-off sensor, such as the left and right pick-off sensors 170*l*, 170*r* shown in FIG. 1, can be determined by using the following equations:

$$Mass_{SMVPhysicalLPO} = \frac{Mass_{SMVLPO}}{G_{LPO}}; \qquad [10]$$

where:
$Mass_{SMVPhysicalLPO}$ is the physical mass value of the vibratory meter measured using the left pick-off sensor;
$Mass_{SMVLPO}$ is the mass value of the vibratory meter associated with the left pick-off sensor;
$G_{LPO}$ is a gain associated with the left pick-off sensor; and $$Mass_{SMVPhysicalRPO} = \frac{Mass_{SMVRPO}}{G_{RPO}}; \qquad [11]$$

where:
$Mass_{SMVPhysicalRPO}$ is the physical mass value of the vibratory meter measured using the right pick-off sensor;
$Mass_{SMVRPO}$ is the mass value of the vibratory meter associated with the right pick-off sensor; and
$G_{RPO}$ is a gain associated with the right pick-off sensor.

The reference mass value $m_{reference}$ and the physical mass values $Mass_{SMVPhysicalLPO}$, $Mass_{SMVPhysicalRPO}$ can be used to determine if there has been a change in the vibratory meter. Additionally, such a change may be traceable to a measurement standard. That is, the comparison between a physical property and a reference physical property, such as between the physical mass values $Mass_{SMVPhysicalLPO}$, $Mass_{SMVPhysicalRPO}$ and the reference mass value $m_{reference}$, may be made. In one example, the comparison may be comprised of determining a deviation from the reference physical property. Such a determination may be made using the following equations:

$$Mass_{traceableDeviationLPO} = \frac{Mass_{SMVPhysicalLPO} - m_{reference}}{m_{reference}} \cdot 100; \quad [12]$$

where:
  $Mass_{traceableDeviationLPO}$ is a traceable deviation of the physical property as measured by the left pick-off sensor from the reference physical property;
  $Mass_{SMVPhysicalLPO}$ is a physical mass of the vibratory meter measured by the left pick-off sensor that is the physical property of the vibratory meter; and
  $m_{reference}$ is a reference mass value that is the reference physical property value of the vibratory meter; and $$Mass_{traceableDeviationRPO} = \frac{Mass_{SMVPhysicalRPO} - m_{reference}}{m_{reference}} \cdot 100; \quad [13]$$

where:
  $Mass_{traceableDeviationRPO}$ is a traceable deviation of the physical property as measured by the right pick-off sensor from the reference physical property;
  $Mass_{SMVPhysicalRPO}$ is a physical mass of the vibratory meter measured by the right pick-off sensor that is the physical property of the vibratory meter; and
  $m_{reference}$ is a reference mass value that is the reference physical property value of the vibratory meter.

As can be appreciated, there are other approaches to standards traceable meter verification. For example, instead of using a comparison between the physical mass values $Mass_{SMVPhysicalLPO}$, $Mass_{SMVPhysicalRPO}$ and the reference mass value $m_{reference}$, a comparison between a physical stiffness value and a reference stiffness value may be made. In this example, the reference mass may be obtained using the above equations [6]-[8]. A gain term can be calculated using above equations [9]-[11] in the following form:

$$G = Mass_{SMV}/Mass_{Reference}. \quad [14]$$

This gain term can be used to calculate a physical stiffness using the following equation:

$$Stiff_{SMVPhysical} = Stiff_{SMV}/G. \quad [15]$$

Accordingly, a stiffness deviation can be calculated using:

$$Stiff_{traceableDeviation} = ((Stiff_{SMVPhysical} - FCF)/FCF) \cdot 100; \quad [16]$$

where:
  $Stiff_{traceableDeviation}$ is a standards traceable stiffness deviation;
  $Stiff_{SMVPhysical}$ is a physical stiffness of the vibratory meter; and
  FCF is a flow calibration factor of the vibratory meter and is the calibration value of the vibratory meter expressed in units of stiffness.

Accordingly, the standards traceable stiffness deviation $Stiff_{traceableDeviation}$ can be used to determine if a change has occurred in the vibratory meter using standards traceable units. As can be appreciated, equations [14]-[16] can be associated with each sensor. For example, a standards traceable stiffness deviation $Stiff_{traceableDeviationLPO}$ associated with a left pick-off sensor, such as the left pick-off sensor 170*l* shown in FIGS. 1 and 2, can be calculated. A standards traceable stiffness deviation $Stiff_{traceableDeviationRPO}$ associated with a right pick-off sensor, such as the right pick-off sensor 170*r* shown in FIGS. 1 and 2, may also be calculated.

Although the above discussion relies on mass and stiffness as exemplary physical properties, other physical properties may be employed. For example, as discussed above, the amount of deflection (e.g., amplitude) of the conduits 130, 130' at the location of the pick-off sensors 170*l*, 170*r* is proportional to the stiffness of the conduits 130, 130' between the driver 180 and the pick-off sensors. Accordingly, the baseline meter verification value may be a baseline amplitude value of the conduits 130, 130'. Similarly, the calibration value may be a calibrated measurement of the amplitude, referred to as a calibrated amplitude value, of the conduits 130, 130' at the locations of the left and right pick-off sensors 170*l*, 170*r* and the meter verification value may be, for example, a voltage of the sensor signals 165.

The calibrated measurement of the amplitude of the conduits 130, 130' may be performed, for example, by using direct, such as using accelerometers, or indirect methods, such as light sources that reflect from the conduits 130, 130'. Relationships, such as gain terms, between the calibrated measurements and the voltages of the sensor signals 165 can be determined by dividing the calibrated measurements by the voltages of the sensor signals 165 by the calibrated amplitude values. Additionally, the calibrated amplitude values can be used to determine a reference value, such as a reference amplitude value, for comparison with an amplitude meter verification value determined during meter verification based on the sensor signals 165.

The above methods 300, 400 discusses relationships between baseline meter verification values and calibration values in the context of two difference methods that either obtains a relationship or determines a relationship based on one of various physical properties. The following describes a method that uses two of the physical properties as well as two of the baseline meter verification values.

Figure 5:
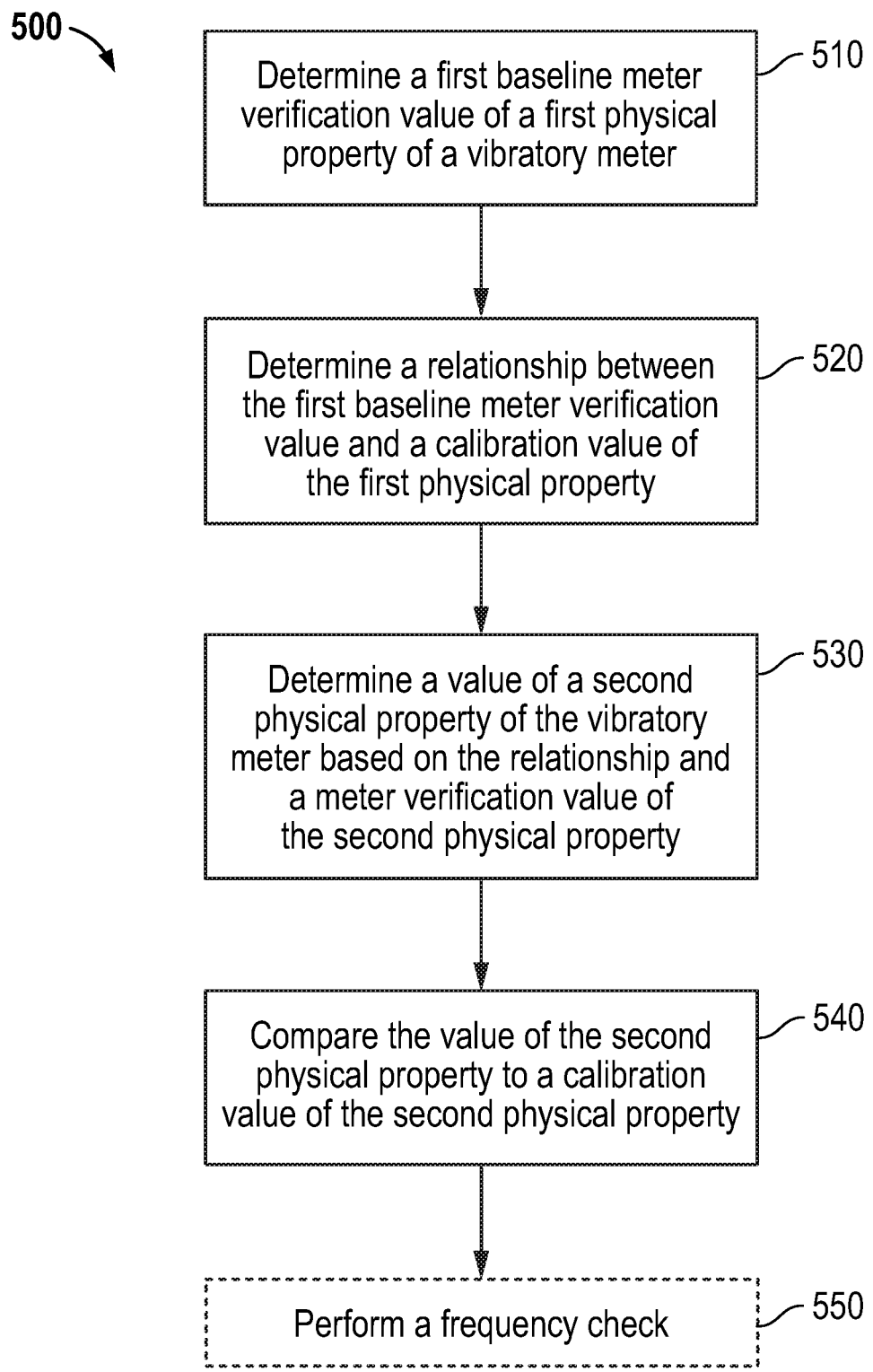
FIG. 5 shows a method 500 for standards traceable verification of a vibratory meter.

FIG. 5 shows a method 500 for standards traceable meter verification of a vibratory meter. As shown in FIG. 5, the method 500 begins by determining a first baseline meter verification value of a first physical property of the vibratory meter in step 510. In step 520, the method 500 determines a relationship between the first baseline meter verification value and a calibration value of the first physical property. In step 530, the method 500 determines a value of a second physical property of the vibratory meter based on the relationship and a meter verification value of the second physical property. The method 500 compares the value of the second physical property to a calibration value of the second physical property in step 540. Additional steps, such as performing a frequency check in step 550, may also be performed to ensure that the foregoing steps 510-540 were correctly performed.

In step 510, the first baseline meter verification value of a first physical property can be one of a baseline mass meter verification value and a baseline stiffness meter verification value. As discussed above with reference to equation [2], the baseline stiffness meter verification value can be proportional to the physical stiffness value and the gain of the sensor associated with the sensor relied on to measure the baseline stiffness meter verification value. Similarly, the baseline mass meter verification value can be proportional to the physical mass value and the gain associated with the sensor relied on to measure the baseline mass meter verification value, as shown in equation [14].

In step 520, the relationship can be determined between the first baseline meter verification value and the calibration value of the first physical property by determining a gain between the first baseline meter verification value and the calibration value of the first physical property. The relationship may, for example, be a gain associated with one of the pick-off sensors. In one example, the gain may be determined using the above discussed equations [3] and [4], which utilizes the stiffness associated with one of the left and right pick-off sensors and the flow calibration factor FCF. The flow calibration factor FCF is an example of a calibration value of the first physical property, the first physical property being the stiffness of the conduits. Alternatively, the gain may be determined using a mass associated with one of the left or right pick-off sensor.

In step 530, the value of the second physical property of the vibratory meter can be determined based on the relationship and a meter verification value of the second physical property by, for example, using the gain associated with one of the left or right pick-off sensor. In one example, where the first physical property is stiffness, the second physical property may be a physical mass. In this example, the value of the second physical property may be a physical mass value associated with one of the left or right pick-off sensors that is determined using the above discussed equations [10] and [11]. However, the first and/or second physical property may be an amplitude of a conduit. Where the first physical property is the physical mass, the value of the second physical property may be a physical stiffness value determined by, for example, equation [15].

In step 540, the value of the second physical property and the calibration value of the second physical property can be compared by, for example, comparing the physical mass value determined for one of the pick-off sensors to a reference mass value determined from a calibration value, such as the reference mass value determined from the tube period on air K1. In one example, the comparison may comprise determining a deviation from a reference mass value as discussed above with reference to equations [12] and [13]. Additionally or alternatively, the comparison may be between a physical stiffness value and a reference stiffness value determined, for example, a calibration value, such as the flow calibration factor FCF, as is shown in equation [16]. Additionally or alternatively, the reference mass value may be determined using the tube period on water K2.

Additional steps, such as the frequency check in step 550, may be performed. For example, a frequency determined from the stiffness and mass according to equation [6], where the tube period on air K1 and flow calibration factor FCF are utilized, may be compared to a measured frequency. This comparison can validate the standards traceable meter verification. For example, if during a meter verification procedure, the measured frequency varies significantly from the frequency estimated from the meter verification stiffness and the meter verification mass, then the standards traceable meter verification can be invalidated. This can ensure that the standards traceable meter verification values are valid. In one example, the frequency check can validate the first baseline meter verification value, the calibration value of the first physical property, the value of the second physical property, and/or the comparison of the value of the second physical property and the calibration value of the second physical property discussed above with reference to method 500.

The frequency check performed in step 550 may be in any suitable form, such as a density of a reference fluid in the vibratory meter calculated from a frequency. For example, a density of air may be estimated from the meter verification stiffness and the meter verification mass and compared to a reference air density value. This reference air density value may be determined during the calibration that determines the tube period on air K1, tube period on water K2, etc. This reference air density value can be determined using standards traceable environmental condition measurements for temperature, pressure, humidity, etc., and may therefore also be considered standards traceable. Accordingly, the validation of the meter verification may also be considered standards traceable.

The above described methods 300, 400, 500 can be implemented by any suitable system. For example, the baseline meter verification and calibration values of the vibratory meter may be determined during calibration and stored in the meter electronics 20, at a customer location, at the vibratory meter's manufacturer, or the like. By storing the baseline meter verification and calibration values, changes to the vibratory meter may be determined relative to reference values determined from the calibration values. An exemplary system is described in the following.

Figure 6:
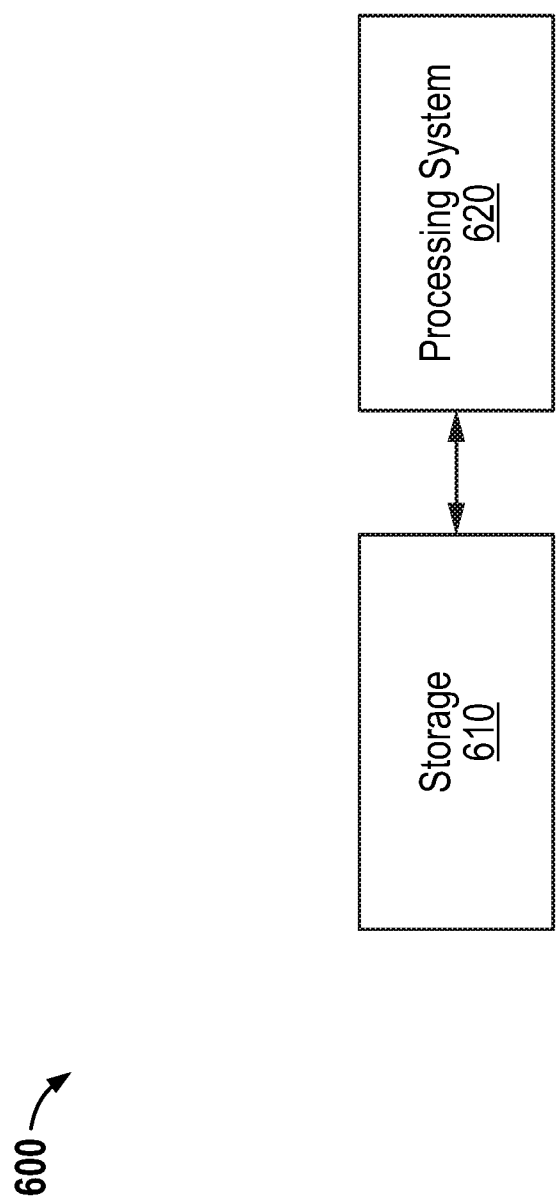
FIG. 6 shows a system 600 for a standards traceable verification of a vibratory meter.

FIG. 6 shows a system 600 for a standards traceable verification of a vibratory meter. As shown in FIG. 6, the system 600 includes a storage 610 that is communicatively coupled to a processing system 620. The storage 610 may be communicatively coupled with the processing system 620 via any suitable means, such as electronic communications over the internet, communications via a computer bus, a local area network, etc. The communications can include, for example, communicating the baseline meter verification values and/or the calibration values. Other values, such as the reference values may also be communicated.

The storage 610 can be anything capable of receiving and storing, for example, the baseline meter verification and the calibration values, and communicating such values to the processing system. For example, the storage 610 may be a memory on the meter electronics 20 that is communicatively coupled to the processing system 620 that is also in the meter electronics 20. Alternatively, the storage 610 may be a server, such as a server hosted by the manufacturer of the vibratory meter 5 that provides the baseline meter verification values and/or calibration values over the internet.

The processing system 620 may be any system configured to determine a baseline meter verification value of the vibratory meter and relate the baseline meter verification value to a calibration value of the vibratory meter. The processing system 620 may also be configured to determine a relationship based on a meter verification value and a calibration value, and determine a physical property of the vibratory meter based on the relationship. The processing system 620 can, for example, be a single processor or multiple processors distributed over a network.

In one example, the processing system 620 may include a processor on the meter electronics 20 described above with reference to FIG. 1. In this example, the processor in the meter electronics 20 can determine the baseline meter verification value using the sensor signals provided by the left and right pick-off sensors 170$l$, 170$r$. A separate processor, such as a workstation communicatively coupled to the meter electronics 20 could determine the calibration value, such as the flow calibration factor FCF described above. Accordingly, the meter electronics 20 and the workstation could comprise the processing system 620. In this example, the workstation can provide the flow calibration factor FCF to the meter electronics 20 and, for example, the manufacturer's server. Additionally, the meter electronics 20 could provide the baseline meter verification value, such as the baseline stiffness and mass values to the manufacturer's server.

The meter electronics 20, a workstation at a customer site, or the like, could request the baseline meter verification value and the calibration value from the manufacturer's server. The meter electronics 20 or workstation could use the baseline meter verification values and the calibration values to determine a relationship, such as a gain. Additionally or alternatively, the manufacturer's server could determine and provide the relationship between the baseline meter verification values and the calibration values. The meter electronics 20, the customer's workstation, the manufacturer's server, or the like, could then determine a value of a physical property, such as a physical mass value of the vibratory meter 5, based on the relationship. This value of the physical property can be used, for example, to perform a standards traceable verification of the vibratory meter using the methods 300, 400, 500 described above.

As can be appreciated, the method 300, 400, 500 and system 600 provide a standards traceable verification of a vibratory meter, such as the vibratory meter 5 described with reference to FIG. 1. The methods 300, 400, 500 and system 600 can, for example, provide a deviation value that is standards traceable. The mass deviation value of the above equation [13] is in a fundamental unit (e.g., mass, force, time, etc.) that is traceable to a measurement standard. Accordingly, the deviation value is not only a measure of relative change specific to a flow meter, but is also a measure of change relative to the measurement standard. This deviation value can therefore, for example, be compared in a meaningful way between various flow meters even though the various flow meters may have different resonant frequencies, mass values (e.g., due to different tube dimensions), stiffness values (e.g., due to various conduit geometries), etc.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other standards traceable verification of a vibratory meter and not just to the embodiments described above and shown in the accompanying figures. Accordingly, the scope of the embodiments described above should be determined from the following claims.

We claim:

1. A system (600) for a standards traceable verification of a vibratory meter (5), the system (600) comprising:
a storage (610) having a baseline meter verification value of the vibratory meter (5);
a processing system (620) in communication with the storage (610), said processing system (620) being configured to:
obtain the baseline meter verification value from the storage (610); and
determine a relationship between the baseline meter verification value and a calibration value of the vibratory meter (5), said calibration value being traceable to a measurement standard.

2. The system (600) of claim 1, wherein the processing system (620) is further configured to determine the baseline meter verification value of the vibratory meter, the baseline meter verification value being associated with one of a right pick-off sensor and a left pick-off sensor.

3. The system (600) of claim 1, wherein the processing system (620) is further configured to determine the baseline meter verification value of the vibratory meter, comprising the processing system (620) being configured to determine the following equation:

$$\text{Stiffness}_{SMV} = \text{Stiffness}_{Physical} \cdot G;$$

where:
$\text{Stiffness}_{SMV}$ is a stiffness meter verification value of the vibratory meter that is the baseline meter verification value;
$\text{Stiffness}_{Physical}$ is a physical stiffness value of the vibratory meter; and
G is a gain associated with one of a left pick-off sensor and a right pick-off sensor.

4. The system (600) of claim 1, wherein the processing system (620) being configured to determine the relationship between the baseline meter verification value and the calibration value comprises the processing system (620) being configured to determine a gain between the baseline meter verification value and the calibration value.

5. The system (600) of claim 4, wherein the gain is associated with one of a right pick-off sensor and a left pick-off sensor.

6. The system (600) of claim 5, wherein the gain is determined using one of the following equations:

$$G_{RPO} = \frac{\text{Stiffness}_{SMVRPO}}{FCF}; \text{ and}$$

$$G_{LPO} = \frac{\text{Stiffness}_{SMVLPO}}{FCF};$$

where:
$G_{LPO}$ is a gain associated with a left pick-off sensor;
$G_{RPO}$ is a gain associated with a right pick-off sensor;
$\text{Stiffness}_{SMVRPO}$ is a stiffness meter verification value associated with the right pick-off sensor;
$\text{Stiffness}_{SMVLPO}$ is a stiffness meter verification value associated with the left pick-off sensor; and
FCF is a flow calibration factor of the vibratory meter and is the calibration value expressed in units of stiffness.

7. The system (600) of claim 1, wherein the processing system (620) being configured to determine a relationship between the baseline meter verification value and the calibration value comprises the processing system (620) being configured to use the following equation:

$$\text{Stiffness}_{Physical} = FCF;$$

where:
$\text{Stiffness}_{Physical}$ is a physical stiffness value of the vibratory meter; and
FCF is a flow calibration factor of the vibratory meter and is the calibration value of the vibratory meter expressed in units of stiffness.

8. The system (600) of claim 1, wherein determining the relationship between the baseline meter verification value and the calibration value of the vibratory meter (5) comprises determining a reference physical property value from the calibration value.

9. The system (600) of claim 1, wherein the baseline meter verification value is one of a baseline mass meter verification value and a baseline stiffness meter verification value of the vibratory meter.

10. The system (600) of claim 1, wherein the calibration value is one of a flow calibration factor and a tube period of the vibratory meter.

11. A method for standards traceable verification of a vibratory meter, the method comprising:
 determining a baseline meter verification value of the vibratory meter; and
 determining a relationship between the baseline meter verification value and a calibration value of the vibratory meter, said calibration value being traceable to a measurement standard.

12. The method of claim 11, wherein determining the baseline meter verification value of the vibratory meter comprises determining a baseline meter verification value associated with one of a right pick-off sensor and a left pick-off sensor.

13. The method of claim 11, wherein determining the baseline meter verification value of the vibratory meter comprises using the following equation:

$$Stiffness_{SMV} = Stiffness_{Physical} \cdot G;$$

where:
 $Stiffness_{SMV}$ is a stiffness meter verification value of the vibratory meter that is the baseline meter verification value;
 $Stiffness_{Physical}$ is a physical stiffness value of the vibratory meter; and
 G is a gain associated with one of a left pick-off sensor and a right pick-off sensor.

14. The method of claim 11, wherein determining the relationship between the baseline meter verification value and the calibration value comprises determining a gain between the baseline meter verification value and the calibration value.

15. The method of claim 14, wherein the gain is associated with one of a right pick-off sensor and a left pick-off sensor.

16. The method of claim 15, wherein the gain is determined using one of the following equations:

$$G_{RPO} = \frac{Stiffness_{SMVRPO}}{FCF}; \text{ and}$$

$$G_{LPO} = \frac{Stiffness_{SMVLPO}}{FCF};$$

where:
 $G_{LPO}$ is a gain associated with a left pick-off sensor;
 $G_{RPO}$ is a gain associated with a right pick-off sensor;
 $Stiffness_{SMVRPO}$ is a stiffness meter verification value associated with the right pick-off sensor;
 $Stiffness_{SMVLPO}$ is a stiffness meter verification value associated with the left pick-off sensor; and
 FCF is a flow calibration factor of the vibratory meter and is the calibration value expressed in units of stiffness.

17. The method of claim 11, wherein determining the relationship between the baseline meter verification value and the calibration value comprises using the following equation:

$$Stiffness_{Physical} = FCF;$$

where:
 $Stiffness_{Physical}$ is a physical stiffness value of the vibratory meter; and
 FCF is a flow calibration factor of the vibratory meter and is the calibration value of the vibratory meter expressed in units of stiffness.

18. The method of claim 11, wherein determining the relationship between the baseline meter verification value and the calibration value comprises determining a reference physical property value from the calibration value.

19. The method of claim 11, wherein the baseline meter verification value is one of a baseline mass meter verification value and a baseline stiffness meter verification value of the vibratory meter.

20. The method of claim 11, wherein the calibration value is one of a flow calibration factor and a tube period of the vibratory meter.

21. A method for a standards traceable verification of a vibratory meter, the method comprising:
 obtaining a relationship between a baseline meter verification value and a calibration value, the calibration value being traceable to a measurement standard; and
 determining a value of a physical property of the vibratory meter based on the relationship.

22. The method of claim 21, wherein the baseline meter verification value is one of a baseline stiffness meter verification value and a baseline mass meter verification value and the calibration value is one of a flow calibration factor and a tube period of the vibratory meter.

23. The method of claim 21, wherein obtaining the relationship between the baseline meter verification value and the calibration value comprises obtaining a gain determined using one of the following equations:

$$G_{RPO} = \frac{Stiffness_{SMVRPO}}{FCF}; \text{ and}$$

$$G_{LPO} = \frac{Stiffness_{SMVLPO}}{FCF};$$

where:
 $G_{LPO}$ is a gain associated with a left pick-off sensor;
 $G_{RPO}$ is a gain associated with a right pick-off sensor;
 $Stiffness_{SMVRPO}$ is a stiffness value associated with the right pick-off sensor;
 $Stiffness_{SMVLPO}$ is a stiffness value associated with the left pick-off sensor; and
 FCF is a flow calibration factor of the vibratory meter and is the calibration value expressed in units of stiffness.

24. The method of claim 21, wherein determining the value of the physical property of the vibratory meter based on the relationship comprises determining a physical mass value of the vibratory meter based on a mass meter verification value of the vibratory meter and a gain.

25. The method of claim 24, wherein determining the physical mass value of the vibratory meter based on the mass meter verification value of the vibratory meter and the gain comprises determining one of the following equations:

$$Mass_{SMVPhysicalLPO} = \frac{Mass_{SMVLPO}}{G_{LPO}};$$

where:
 $Mass_{SMVPhysicalLPO}$ is the physical mass value of the vibratory meter determined using a left pick-off sensor;

Mass$_{SMVLPO}$ is the mass meter verification value of the vibratory meter associated with the left pick-off sensor;

G$_{LPO}$ is a gain associated with the left pick-off sensor; and $$Mass_{SMVPhysicalRPO} = \frac{Mass_{SMVRPO}}{G_{RPO}};$$

where:

Mass$_{SMVPhysicalRPO}$ is a physical mass value of the vibratory meter determined using the right pick-off sensor;

Mass$_{SMVRPO}$ is the mass meter verification value of the vibratory meter associated with the right pick-off sensor; and G$_{RPO}$ is a gain associated with the right pick-off sensor.

26. The method of claim 21, further comprising comparing the value of the physical property of the vibratory meter to a reference physical property value determined from a second calibration value of the vibratory meter.

27. The method of claim 26, wherein comparing the value of the physical property of the vibratory meter to the reference physical property value comprises determining a deviation from the reference physical property value using one of the following equations:

$$Mass_{traceableDeviationLPO} = \frac{Mass_{SMVPhysicalLPO} - m_{reference}}{m_{reference}} \cdot 100;$$

where:

Mass$_{traceableDeviationLPO}$ is a standards traceable deviation of the physical property as measured by a left pick-off sensor from the reference physical property value;

Mass$_{SMVPhysicalLPO}$ is a physical mass value of the vibratory meter determined using the left pick-off sensor that is the physical property of the vibratory meter; and m$_{reference}$ is a reference mass value that is the reference physical property value of the vibratory meter; and $$Mass_{traceableDeviationRPO} = \frac{Mass_{SMVPhysicalRPO} - m_{reference}}{m_{reference}} \cdot 100;$$

where:

Mass$_{traceableDeviationRPO}$ is a standards traceable deviation of the physical property as measured by the right pick-off sensor from the reference physical property value;

Mass$_{SMVPhysicalRPO}$ is a physical mass of the vibratory meter measured by the right pick-off sensor that is the physical property of the vibratory meter; and m$_{reference}$ is a reference mass value that is the reference physical property value of the vibratory meter.

28. The method of claim 26, wherein the reference physical property value is a reference mass value that is determined using the following equation:

$$m_{reference} = \frac{FCF}{(freq_{reference})^2}$$

m$_{reference}$ is the reference mass value that is the reference physical property value;

FCF is a flow calibration factor that is the calibration value expressed in units of stiffness; and freq$_{reference}$ is a reference frequency value that is determined from a second calibration value, the second calibration value being a tube period on air K1.

29. A method of standards traceable verification of a vibratory meter, the method comprising:
   determining a first baseline meter verification value of a first physical property of the vibratory meter;
   determining a relationship between the first baseline meter verification value and a calibration value of the first physical property, the calibration value being traceable to a measurement standard;
   determining a value of a second physical property of the vibratory meter based on the relationship and a meter verification value of the second physical property; and
   comparing the value of the second physical property to a calibration value of the second physical property.

30. The method of claim 29, wherein the first baseline meter verification value is one of a baseline mass meter verification value, a baseline stiffness meter verification value, and a baseline conduit amplitude value.

31. The method of claim 29, wherein determining the relationship between the first baseline meter verification value and the calibration value of the first physical property comprises determining a gain between the first baseline meter verification value and the calibration value of the first physical property.

32. The method of claim 29, wherein comparing the value of the second physical property to the calibration value of the second physical property comprises comparing the value of the second physical property to a reference physical property value determined from the calibration value.

33. The method of claim 29, further comprising performing a frequency check of at least one of the first baseline meter verification value, the calibration value of the first physical property, the value of the second physical property, and the comparison of the value of the second physical property and the calibration value of the second physical property.

* * * * *